United States Patent [19]
Kato et al.

[11] Patent Number: 5,347,824
[45] Date of Patent: Sep. 20, 1994

[54] SYSTEM FOR DETECTING THE COMPRESSION OF LIQUID REFRIGERANT IN A COMPRESSOR AND CONTROLLING THE COMPRESSOR

[75] Inventors: Yasuhiro Kato, Ama; Hideki Suzuki, Chita, both of Japan

[73] Assignee: Nippondenso Co. Ltd., Kariya, Japan

[21] Appl. No.: 46,863

[22] Filed: Apr. 8, 1993

[30] Foreign Application Priority Data

Apr. 9, 1992 [JP] Japan ............................ 4-088461
Feb. 26, 1993 [JP] Japan ............................ 5-038105

[51] Int. Cl.$^5$ .............................................. F16D 27/16
[52] U.S. Cl. ......................................... 62/133; 62/83; 62/323.4; 123/339
[58] Field of Search ............. 62/133, 83, 323.1, 323.4, 62/125, 126, 129; 123/339

[56] References Cited

U.S. PATENT DOCUMENTS 4,939,909 7/1990 Tsuchiyama et al. ............ 62/126 X
5,056,326 10/1991 Ohkumo et al. ................ 62/323.4 X

FOREIGN PATENT DOCUMENTS 58-191326 11/1983 Japan ........................... F16D 27/16
60-146924 8/1985 Japan ........................... F16D 27/16
60-164024 8/1985 Japan ........................... F16D 27/16

Primary Examiner—Harry B. Tanner
Attorney, Agent, or Firm—Cushman, Darby & Cushman

[57] ABSTRACT

Problems accompanying the appearance of compressed liquid refrigerant in a compressor are solved and deterioration of vehicle performance and degeneration of a magnetic clutch (when there is no compressed liquid refrigerant in the compressor) are prevented. An ECU 7 for energizing magnetic clutch 5 determines that there is liquid refrigerant in a compressor when a reduction rate $\Delta NE$ of the engine revolution number is larger than a set value when the compressor 4 is started and the magnetic clutch is de-energized for a certain period of time.

12 Claims, 8 Drawing Sheets

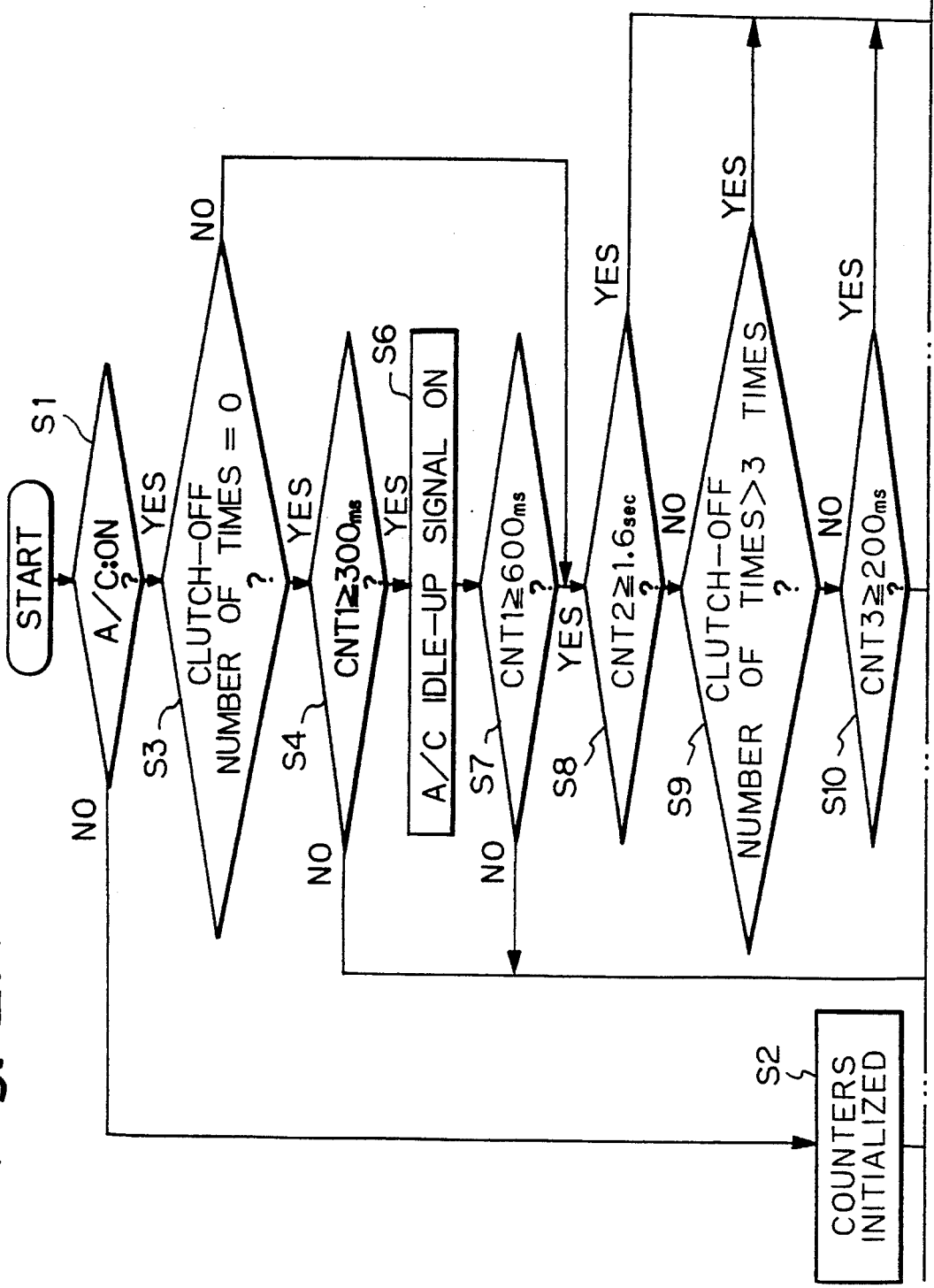

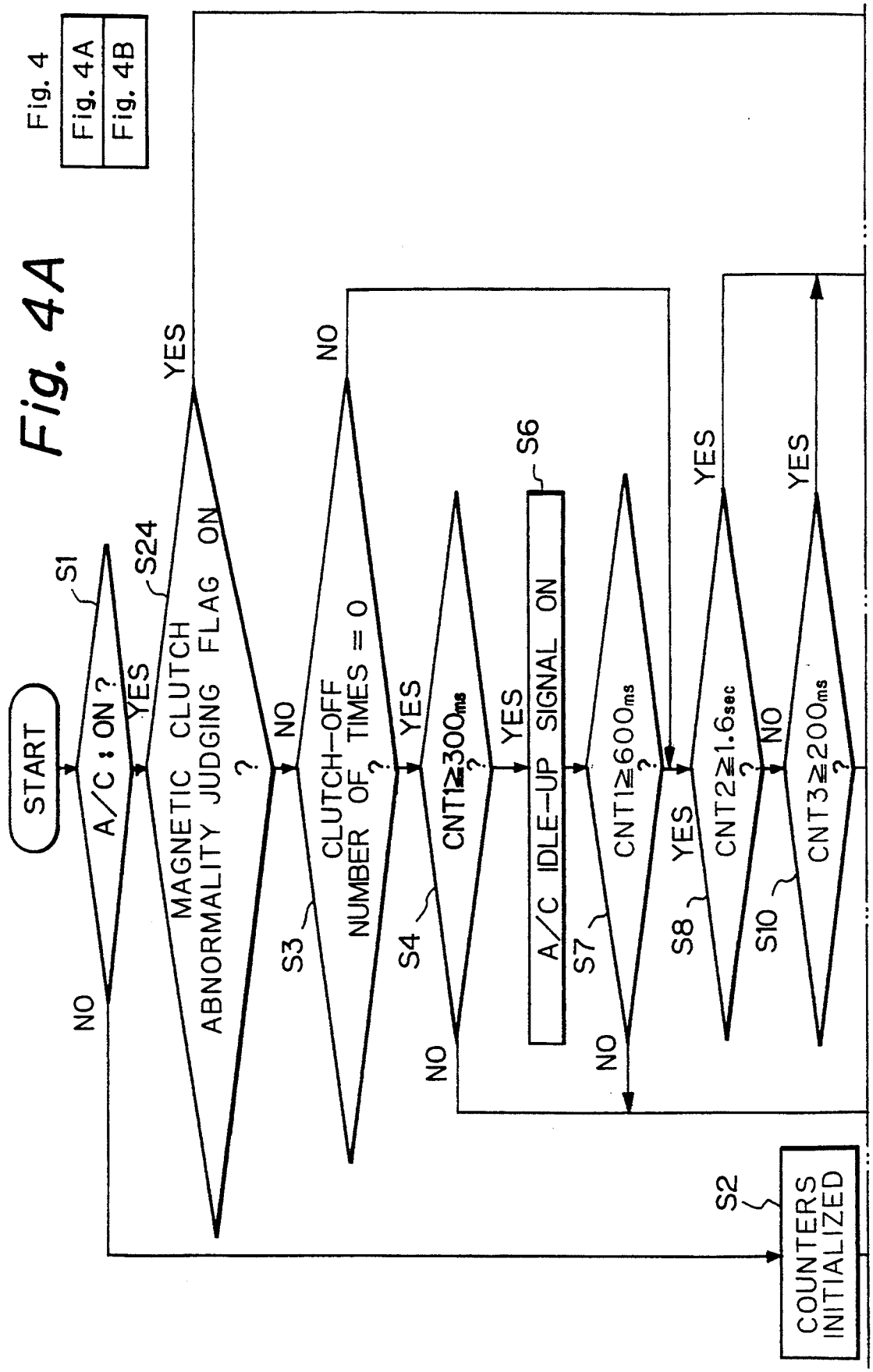

SYSTEM FOR DETECTING THE COMPRESSION OF LIQUID REFRIGERANT IN A COMPRESSOR AND CONTROLLING THE COMPRESSOR

BACKGROUND OF THE INVENTION

1. Field of the Invention

The present invention relates to a device for detecting the compression of liquid refrigerant in a compressor when the compressor is started and a device for controlling the compressor after detecting the compressed liquid refrigerant.

2. Description of the Related Art

Among the functional parts constituting an air conditioner for a vehicle, an evaporator is arranged inside the vehicle (adjacent the passenger compartment), while a compressor is arranged in an engine compartment which is relatively susceptive to the influence of outside air temperature. The compressor is arranged at a position lower than the evaporator and the condenser.

Accordingly, when a vehicle parked for a long time at a place where the temperature is very low, the temperature in the passenger compartment of the car is relatively high due to sunlight shining through the vehicle windows during the day as compared to the temperature in the engine compartment as a result. That is, the refrigerant in the air conditioner moves from the warm side (evaporator side) to the cool side (compressor side) and condenses to liquid. As the compressor is arranged at the position lower than the evaporator, the condenser and so on, the liquid refrigerant collects at the compressor and accumulates in the cylinder of the compressor.

When the compressor is operated in this state, the liquid in the cylinder causes noise and rapid pressure rise which might damage the compressor. Also, with the rapid fall in engine revolutions, the performance of the vehicle suffers.

The Japanese Unexamined Patent Publication No. 191326/58 discloses a technique to solve the above problem by pulse-driving a magnetic clutch when the compressor starts and by adjusting the pulse-width of the energizing pulses so that they get wider gradually so as to increase the speed of the compressor slowly.

Also, Japanese Unexamined Patent Publications No. 146924/60 and No. 164024/60 disclose a technique to gradually engage the magnetic clutch with the aim of preventing mechanical shock when the magnetic clutch engages.

However, in the conventional techniques disclosed in the above publications, because the intermittent on/off control of the magnetic clutch is initiated not only at the time when liquid refrigerant accumulates in the cylinder of the compressor, but at any time the compressor is started, abrasion and deterioration of the magnetic clutch will occur.

Also, in the above prior arts, as idle speed is increased when there is no compressed liquid refrigerant in the compressor, the engine revolutions are further increased when the magnetic clutch is disengaged, and vibration and other problems will adversely affect vehicle performance.

SUMMARY OF THE INVENTION

The present invention is made in view of the aforementioned drawbacks, and the object of the present invention is to detect whether the compressor contains compressed liquid refrigerant, to take measures to prevent problems if the compressor contains liquid refrigerant in compressed condition, and to prevent deterioration of vehicle performance when there is no compressed liquid refrigerant in the compressor, and to prevent degeneration of the magnetic clutch.

An object of the present invention is thus to provide a detecting device, as a first means to detect compressed condition of the liquid refrigerant in a compressor, comprising:

a compressor which constitutes a refrigerating system with a condenser, an expansion valve and an evaporator and compresses a refrigerant in a refrigerating system;

a magnetic clutch which transmits torque from an engine to the above compressor when electrically energized, and does not transmit torque of the above engine to the above compressor when de-energized;

a control means for controlling this magnetic clutch; and a means for detecting a reduction rate, in the driving force of the above engine immediately after the above magnetic clutch is energized based on the above control means and characterized in that compressed liquid refrigerant in the above compressor is detected by comparing the reduction rate in driving force detected by the above reduction rate detecting means with a predetermined value and by determining that the above reduction rate is larger than the above predetermined value.

Another object of the present invention is to provide a compressor control means, as a second means to take action to prevent problems only when compression of the liquid refrigerant is detected in the compressor, comprising:

a compressor which constitutes a refrigerating system with a condenser, an expansion valve and an evaporator and compresses a refrigerant in a refrigerating system;

a magnetic clutch which transmits a torque of an engine to the above compressor when electrically energized and does not transmit the torque of the engine to the compressor when de-energized;

a control means for controlling this magnetic clutch;

a means for detecting a reduction rate in the driving force of the above engine immediately after the above magnetic clutch is energized based on the above control means; and a stopping means for comparing the reduction rate detected by this reduction rate detecting means with a predetermined value and for immediately de-energizing the above magnetic clutch for a certain period of time when the above reduction rate is larger than the above predetermined value.

BRIEF DESCRIPTION OF THE DRAWINGS

FIGS. 2A and 2B are flow charts showing the operating logic of an engine control unit according to the first preferred embodiment of FIG. 1;

FIG. 2 shows now FIGS. 2A and 2B are aligned.

FIGS. 4A and 4B are flow charts showing the operating logic of an engine control unit according to a second preferred embodiment;

FIG. 4 shows how FIGS. 4A and 4B are aligned.

DETAILED DESCRIPTION OF THE PREFERRED EMBODIMENTS

A first preferred embodiment of a compressed liquid refrigerant detecting device and compressor control device of the present invention will be hereinafter described based on FIG. 1 to FIG. 3.

Figure 1:
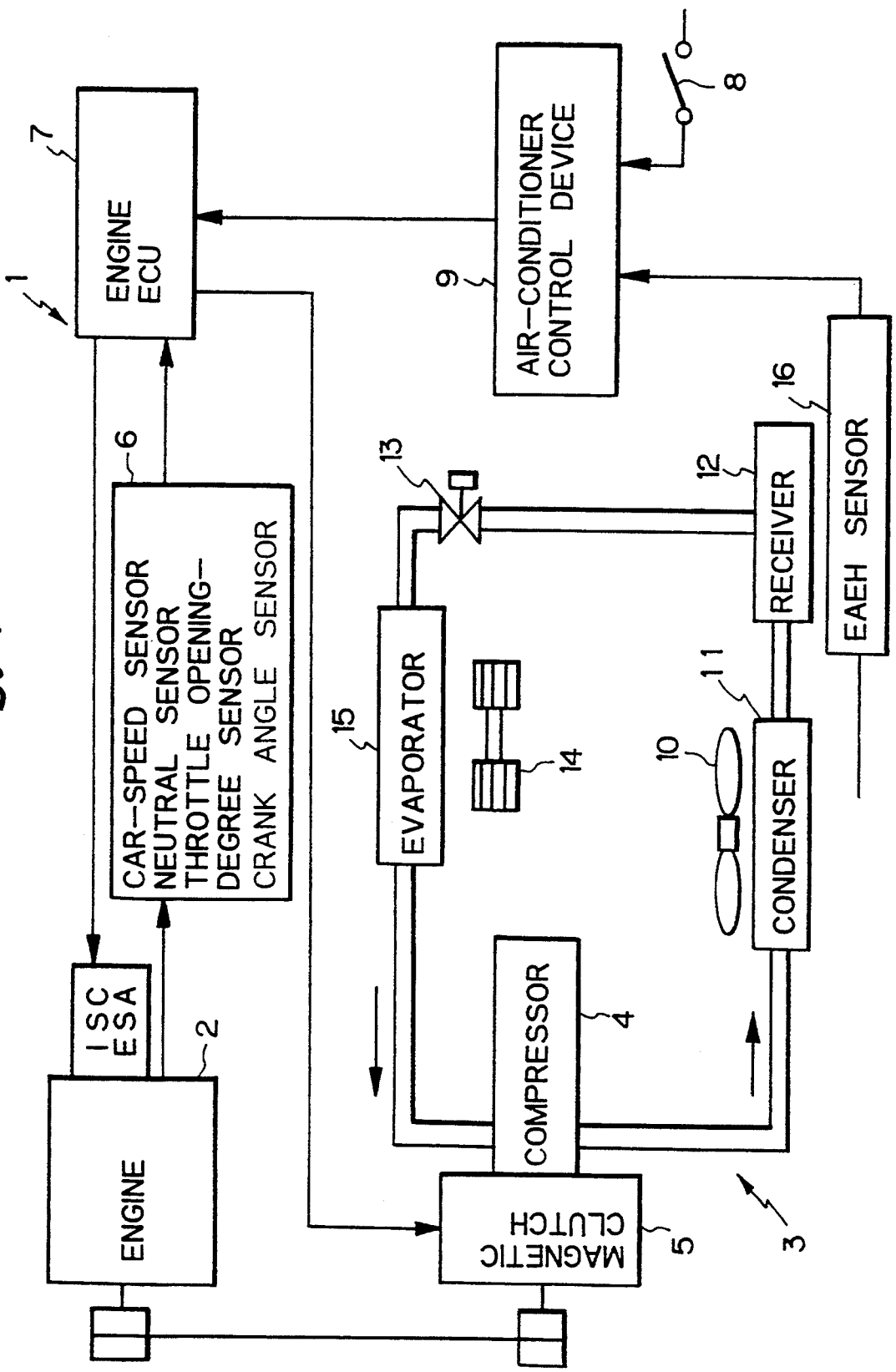
FIG. 1 is an overall block diagram of a liquid refrigerant detecting device and compressor control device according to a first preferred embodiment.

FIG. 1 is an overall block diagram of a device for detecting presence of compressed liquid refrigerant and a compressor control device.

A device for detecting presence of liquid refrigerant in compressed condition and a compressor control device 1 of this preferred embodiment is constituted by a magnetic clutch 5 for transmitting a torque from a vehicle engine 2 to a compressor 4 of a refrigerating system 3, various sensors 6 (car-speed sensor, neutral sensor, throttle opening-degree sensor, crank angle sensor and so on) for detecting the operating state of the engine 2, an engine control unit (computer) 7 (hereinafter referred to as an ECU) for controlling the magnetic clutch 5 based on information from the various sensors 6 and an air-conditioner control device 9 for converting an ON signal of an air-conditioner switch 8 (controlling means of the present invention) provided at an air-conditioner control panel (not shown) into an air-conditioner starting signal and sending it to the ECU 7.

The refrigerating system 3 is constituted by a condenser 11 for cooling and condensing the high-temperature, high-pressure refrigerant compressed by the compressor 4 by air from a fan 10, a receiver 12 arranged for the refrigerant downstream of this condenser 11, an expansion valve 13 for decompressing the liquid refrigerant received by this receiver 12 and an evaporator 15 for evaporating the refrigerant decompressed and expanded by this expansion valve 13.

The magnetic clutch 5 transmits the torque of the engine 2 when energized by the ECU 7 and does not transmit the torque of the engine 2 to the compressor 4 when de-energized.

The ECU 7 controls the magnetic clutch 5 when the air-conditioner starting signal from the air-conditioner control device 9 is enabled and controls engine parameters as ignition timing control (ESA), idle revolution number control (ISC) and so on based on the information from various sensors 6. Also, the ECU 7 carries out idle-up control for increasing the idle revolutions of the engine 2 by ESA and ISC allowing for torque loss due to operating the compressor 4.

The air-conditioner control device 9 outputs the air conditioner starting signal to the ECU 7 and carries out automatic control for cabin temperature, blown air volume, mode switching, etc. when signals from various sensors 16 such as cabin air temperature sensor, outside air temperature sensor, insolation sensor, etc. are input.

The device 1 carries out starting control for preventing generation of noise and damage on the compressor 4 due to the compressed liquid refrigerant in the compressor.

The starting control is to de-energize the magnetic clutch 5 for a certain period of time when it is determined that there is compressed liquid refrigerant in the compressor at start time and to expel the liquid refrigerant in the compressor 4 by inertial rotation of the compressor.

Judgment of if liquid refrigerant in compressed condition is in the compressor is made by comparing a reduction rate $\Delta NE$ in the engine revolutions when compressor 4 is started with a set value which is set in advance. If there is compressed liquid refrigerant in compressor 4 when it is started, the drop in revolutions of engine 2 is larger than usual (when there is no compressed liquid refrigerant in the compressor) (See FIG. 3). Then, if this reduction rate $\Delta NE$ of the engine revolutions is larger than the set value, it is judged that there is compressed liquid refrigerant in the compressor.

In order to determine if liquid refrigerant in the compressed condition is in the compressor, the ECU 7 is provided with a $\Delta NE$ calculating means (not shown, an engine revolution reduction rate detecting means of the present invention) for calculating $\Delta NE$ when the compressor 4 starts based on a detected value from the crank angle sensor 6 and a detecting means (See FIGS. 2A and 2B) for detecting whether a calculated value calculated by the $\Delta NE$ calculating means is larger than the set value or not.

The set value to be compared with $\Delta NE$ is set according to the driving state of the engine 2 (engine revolution number, shift position of a transmission, on/off state of an idle signal showing idling state, etc.) based on a change rate $\Delta NEO$ of the engine revolution number immediately before the magnetic clutch 5 is energized. The set values set according to the shift position of the transmission (neutral: N, 10 drive: D) and the on/off state of the idle signal are shown in Table 1. Here, k= engine revolution number/1000, $0.6<1/k<1$.

TABLE 1

| Range | Idle signal | Set value (rpm/8 ms) |
|---|---|---|
| N | ON | $\Delta NEO-10$ |
|   | OFF | $\Delta NEO-10/K$ |
| D | ON | $\Delta NEO-7$ |
|   | OFF | $\Delta NEO-7/K$ |

Next, starting control by ECU 7 will be described based on the flow chart shown in FIGS. 2A and 2B. Here, the calculation cycle of ECU 7 is 8 ms.

First, before the air-conditioner switch 8 is turned on (NO at Step 1), all counters (CNT 1, CNT 2, CNT 3) relating to the air-conditioner control are initialized. Here, CNT 1 is a counter for counting a delay time from when the air-conditioner switch 8 is turned on until the idle-up control is enabled and when the magnetic clutch 5 is energized. CNT 2 is a counter for counting a continuation time during which the magnetic clutch 5 is energized and CNT 3 is a counter for counting a stop time during which the magnetic clutch 5 is de-energized. The magnetic clutch off counter is a counter for counting the number of times that the magnetic clutch 5 is temporarily de-energized.

Next, the control from when the air-conditioner switch 8 is turned on until the magnetic clutch 5 is energized will be explained.

Immediately after the air-conditioner switch 8 is turned on (YES at Step 1, YES at Step 3 and NO at Step 4), CNT 1 is started (Step 5). When the CNT 1 counts to 300 ms (YES at Step 4), a first delay time has elapsed since the air conditioner switch 8 was turned on, and a signal is output to the ESA and ISC (Step 6: idle-up control). Moreover, when the CNT 1 counts to 600 ms (YES at Step 7), a second delay time has elapsed since the air-conditioner switch 8 was turned on and the magnetic clutch 5 is energized at Step 14, which will be described.

That is, immediately after the air-conditioner switch 8 is turned on, if conditions relating to control end and the temporary de-energization of magnetic clutch 5 is not true, Step 8 to Step 11 are NO and program control goes to Step 12. At Step 12, it is determined whether the reduction rate $\Delta NE$ of engine revolutions is larger than the set value, but as the magnetic clutch 5 is not energized immediately after the control is started, $\Delta NE$ is smaller than the set value (NO at Step 12) and the magnetic clutch 5 is energized (Step 14) and the CNT 2 is counted up (Step 15). Step 22 is a step to determine if the magnetic clutch 5 was off the previous time, and as the magnetic clutch was not energized the previous time, a value of the change rate of the engine revolutions ($\Delta NEO$, which was mentioned above) is read at Step 23 and control passes to Step 14.

Next, control in the case where the reduction rate in engine revolutions is large after the magnetic clutch 5 is energized and liquid refrigerant in the compressed condition is detected in the compressor will be described.

When $\Delta NE$ is larger than the set value (YES at Step 12), the number of energizations of the magnetic clutch 5 are counted (Step 17) and the magnetic clutch 5 is de-energized (Step 18). At the same time, the control signal to the ESA and ISC is interrupted (Step 19), CNT 3 is started (Step 20) and CNT 2 is cleared (Step 21). When the magnetic clutch 5 is de-energized, to stop the control signal to the ESA and ISC, the idle-up control and delay processing (Step 4 to Step 7) are bypassed (NO at Step 3). Also, Step 12 for comparing $\Delta NE$ with the set value and Step 17 for counting the off number of the magnetic clutch 5 are bypassed (YES at Step 11), and Step 18 to Step 21 are carried out till a certain period of time (200 ms in this preferred embodiment) has elapsed since the magnetic clutch 5 was de-energized (CNT 3≧200 ms).

Then, at the time when the CNT 3 counts to 200 ms (YES at Step 10), the control signal to the ESA and the ISC are output again (Step 13), and at the same time, the magnetic clutch 5 is energized (Step 14), counting of CNT 2 is started and the CNT 3 is cleared (Step 15 and Step 16).

After the magnetic clutch 5 is energized, $\Delta NE$ is compared with the set value again (Step 12), and if $\Delta NE$ is still larger than the set value (YES at Step 12), the magnetic clutch 5 is de-energized again, and the control signal to the ESA and the ISC (Step 18 and Step 19) is interrupted.

Next, how the control of the magnetic clutch 5 is terminated will be explained.

When the energization time of the magnetic clutch 5 exceeds 1.6 sec (YES at Step 8), it is considered that engine revolutions are not lowered by the compressed liquid refrigerant in the compressor and that the compressor starting control sequence is finished. Also, when the control to de-energize the magnetic clutch 5 for a predetermined number of times, for example, three times (YES at Step 9), the starting control sequence is terminated as the compressed liquid refrigerant in the compressor has been removed.

After the starting control sequence is finished, the idle-up control is maintained and the magnetic clutch 5 is kept energized.

Next, the action of this preferred embodiment will be explained referring to the timing chart.

Figure 3:
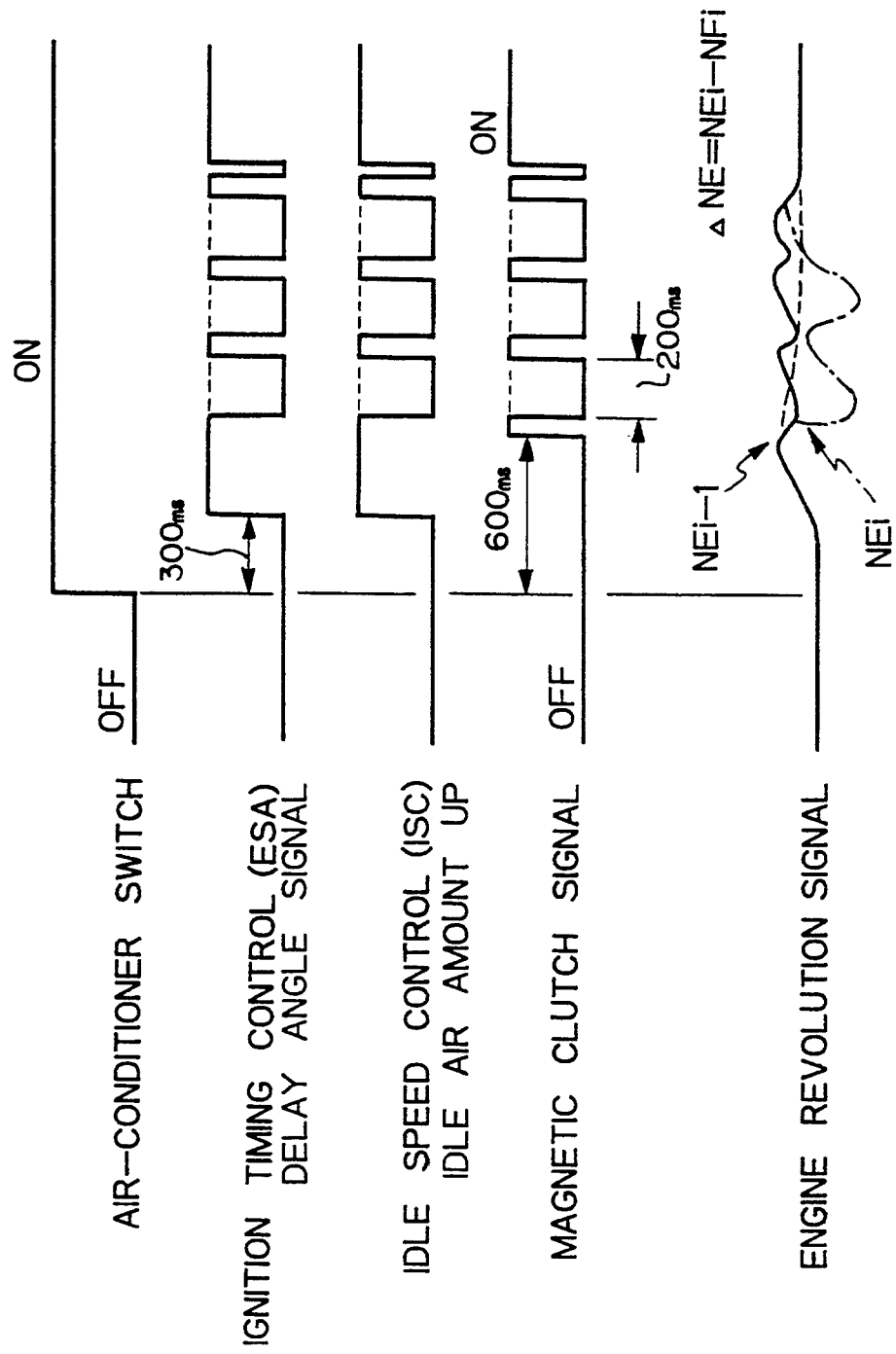
FIG. 3 is a timing chart of the above first preferred embodiment according to starting control.

In FIG. 3, the solid line indicates the behavior when the stopping means is operated because it is judged that there is the compressed liquid refrigerant in the compressor in this present invention, the broken line is the behavior in the case where there is no compressed liquid refrigerant in the compressor and the dashed line is the behavior in the case where there is the compressed liquid refrigerant in the compressor.

After the idle-up control is executed to allow for the torque loss of the engine 2 when of the air-conditioner switch 8 is turned on by the user, the magnetic clutch 5 is energized.

After the magnetic clutch 5 is energized, it is determined that liquid refrigerant in the compressed condition is in the compressor when the reduction rate $\Delta NE$ of engine revolutions is larger than the set value, as shown by the solid line in FIG. 3, the magnetic clutch 5 is de-energized for a certain period of time (200 ms). By de-energizing the magnetic clutch 5 in this way, the compressor 4 makes inertial rotations and the compressed liquid refrigerant in the compressor 4 is slowly expelled.

Also, when $\Delta NE$ is smaller than the set value, it is determined that there is no compressed liquid refrigerant in the compressor, and, as shown by the broken line in FIG. 3, the magnetic clutch 5 is not de-energized and the idle-up control signal is maintained.

When the magnetic clutch 5 is de-energized, it is energized again after the certain period of time has passed, and $\Delta NE$ is compared with the set value again and when $\Delta NE$ get smaller than the set value, it is judged that there is no liquid refrigerant in the compressor any longer and the idle-up control is maintained and the magnetic clutch 5 remains energized.

When $\Delta NE$ does not get smaller than the set value even after the magnetic clutch 5 has been energized for one cycle, the magnetic clutch 5 can be de-energized for a total of three times.

When the magnetic clutch 5 is de-energized, in order to restrain the rise in the engine revolutions caused by the idle-up control, the control signal to the ESA and the ISC is also inhibited at the same time as the magnetic clutch 5 is de-energized so as to reduce fluctuations in the engine revolutions.

As mentioned above in detail, in this preferred embodiment, when a presence of the compressed liquid refrigerant in the compressor is detected, the magnetic clutch 5 is de-energized and the compressed liquid refrigerant in the compressor 4 can be expelled by inertial rotation of the compressor 4. By this method, generation of noise or damage on the compressor 4 due to the compressed liquid refrigerant in the compressor can be prevented, and vehicle performance can be improved by reducing fluctuations in the revolutions of the engine 2.

Figure 2B:
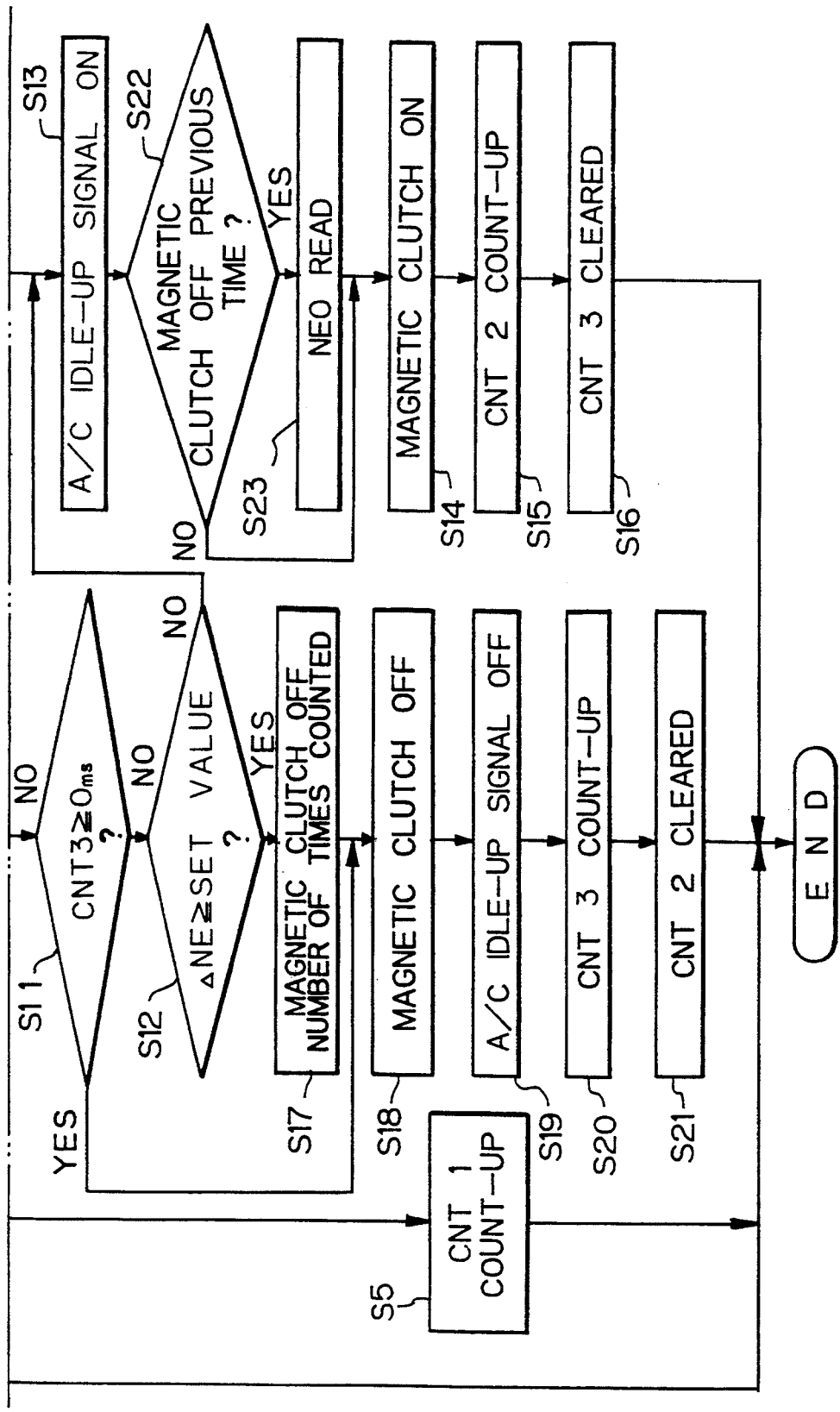

Also, in this preferred embodiment, the engine revolution reduction rate detecting means is constituted by the control processing at Step 12 shown in FIGS. 2A and 2B, and the stopping means is constituted by a series of control processing steps, Step 18, Step 20, Step 10 and Step 11.

Figure 4B:
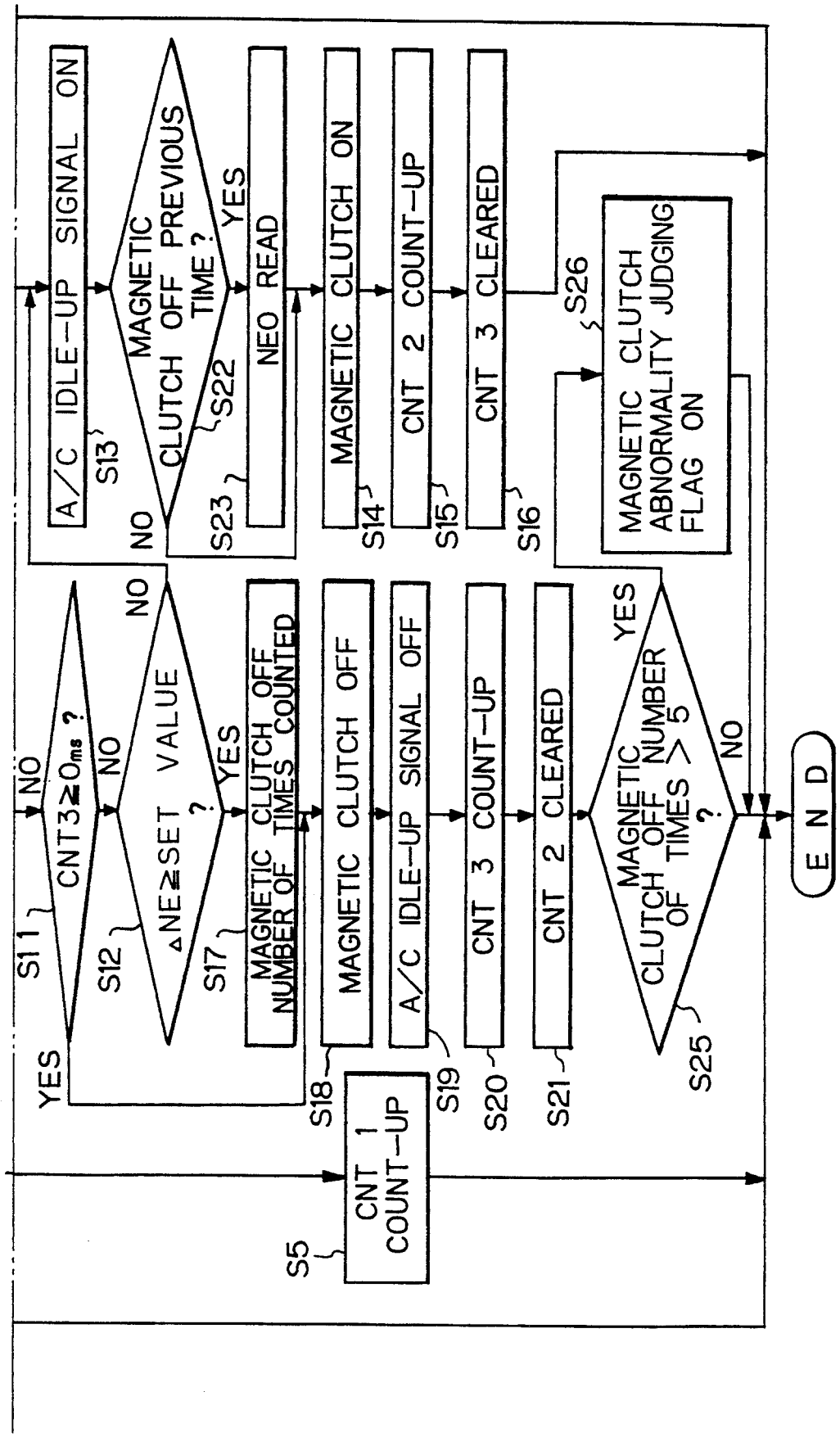

Next, a second preferred embodiment of the present invention will be explained using a flow chart in FIGS. 4A and 4B and a timing chart in FIG. 5. The same reference numbers in FIGS. 2A and 2B are given to the steps in the flow chart in FIGS. 4A and 4B which execute the same control as those in the flow chart in FIGS. 2A and 2B. Also, the calculation cycle of the engine ECU 7 is 8 ms. The overall constitution of this preferred embodiment is the same as the above first preferred embodiment.

First, before the air-conditioner switch 8 is turned on (NO at Step 1), all the counters (CNT 1, CNT 2, CNT 3, magnetic clutch off-number counter) relating to the air-conditioner control system are initialized.

Then, when the air-conditioner switch 8 is tuned on (YES at Step 1), it is judged at Step 24 whether a magnetic clutch abnormality detection flag is on or not. Here, the magnetic clutch abnormality detection flag is a 10 flag which is turned on in the abnormality state, for example, where the compressor is locked. This time, the decision at Step 24 is NO and the program goes to Step 3.

After that, as mentioned in the first preferred embodiment, the CNT 1 is counted up, and when 300 ms have passed since the CNT 1 started, the idle-up signal is turned on, and when 600 ms have passed since the CNT 1 started count-up, the magnetic clutch 5 is energized. And when the reduction rate of the engine revolution number exceeds the predetermined value, the magnetic clutch 5 is de-energized for a certain period of time (200 ms in this preferred embodiment). After the certain period of time has passed, the magnetic clutch 5 is energized again and if the reduction rate of the engine revolution number is still larger than the predetermined value, the magnetic clutch 5 is de-energized for the certain period of time again.

When the magnetic clutch-off number counted at Step 17 reaches 6, it is detected to be YES at Step 25 and the above mentioned magnetic clutch abnormality detection flag is turned on at Step 26. After the magnetic clutch abnormality detection flag is turned on at Step 26, it is detected to be YES at Step 24 when the control in this flow chart is executed next time so as to immediately leave this flow chart. That is, the magnetic clutch 5 is kept de-energized.

When the off-number of the magnetic clutch 5 counted at Step 17 reaches 6 times in the second preferred embodiment, that is, the reduction rate of the engine revolutions exceeds the set value for the second predetermined number of times which is larger than the above first predetermined number of times, for example, 6 times immediately after the magnetic clutch 5 is energized, the magnetic clutch 5 is not energized again. The reason is as follows: if the reduction rate of the engine revolution number exceeds the set value due to liquid compression of the compressor 4, one or two executions of the control for de-energizing the magnetic clutch 5 for the certain period of time will reduce the amount of the compressed liquid refrigerant in the compressor 4 to such an insignificant amount that will not cause noise or damage to compressor 4, and the reduction rate of the engine revolutions at the time when magnetic clutch 5 is energized also gets small. However, when the reduction rate in engine revolutions exceeds the set value as many as 6 times when the magnetic clutch is energized, the cause is not the compressed liquid refrigerant in the compressor 4 but there must be another cause such as locking of the compressor. Thus, as the compressor 4 should not be operated in this case, when the off-number count for the magnetic clutch 5 is more than 6, the magnetic clutch abnormality detection flag is turned on at Step 25 and Step 26 and the magnetic clutch 5 is kept de-energized.

Figure 5:
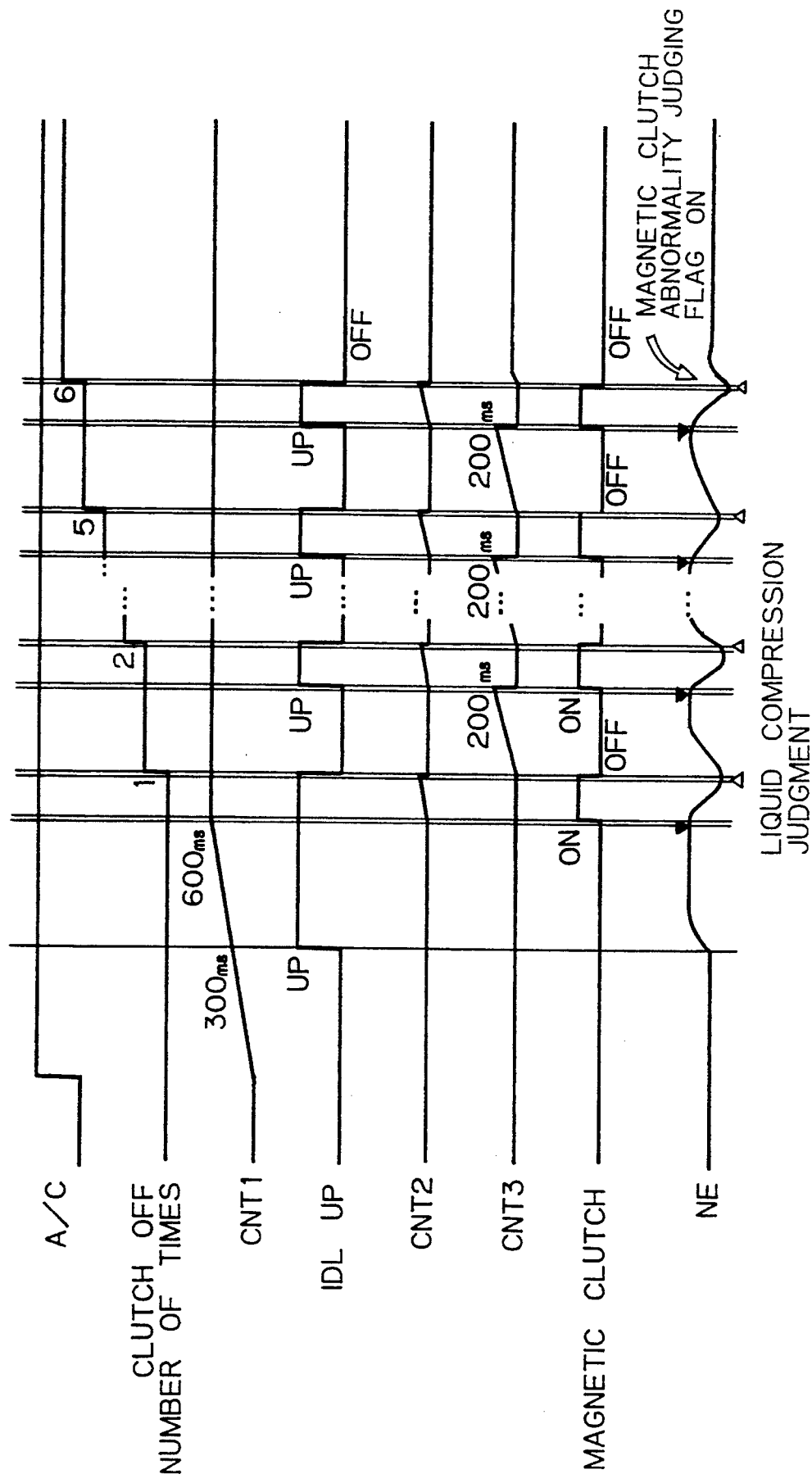
FIG. 5 is a timing chart of the above second preferred embodiment according to starting control.

A device in the second preferred embodiment acts as shown in the timing chart in FIG. 5. If the compressor 4 should be locked, after the magnetic clutch-off count number reaches 6 as shown in FIG. 5, the magnetic clutch is kept de-energized.

As mentioned above in detail, in the second preferred embodiment, if the compressor 4 is locked, for example, the fact is detected and the magnetic clutch 5 is not energized after that, and problems such as damage to the compressor 4 due to compressor lock can be avoided.

In the above first and the second preferred embodiments, $\Delta NE$ is compared with the set value every time after the magnetic clutch 5 is energized, but it may be so controlled that $\Delta NE$ is compared with the set value only after the magnetic clutch 5 is electrified for the first time, and when it is determined that liquid refrigerant in the compressed condition is in the compressor the magnetic clutch 5 is de-energized for the predetermined number of times without comparing $\Delta NE$ with the set value after the first time.

Also, in the above first preferred embodiment, when the number of times that the magnetic clutch 5 is de-energized reaches 3 times, the magnetic clutch 5 is continually energized even if $\Delta NE$ is larger than the set value at that time, but it may be so controlled that the magnetic clutch 5 is repeatedly de-energized until $\Delta NE$ gets smaller than the set value.

Next, a third preferred embodiment will be explained using FIG. 6.

Figure 6:
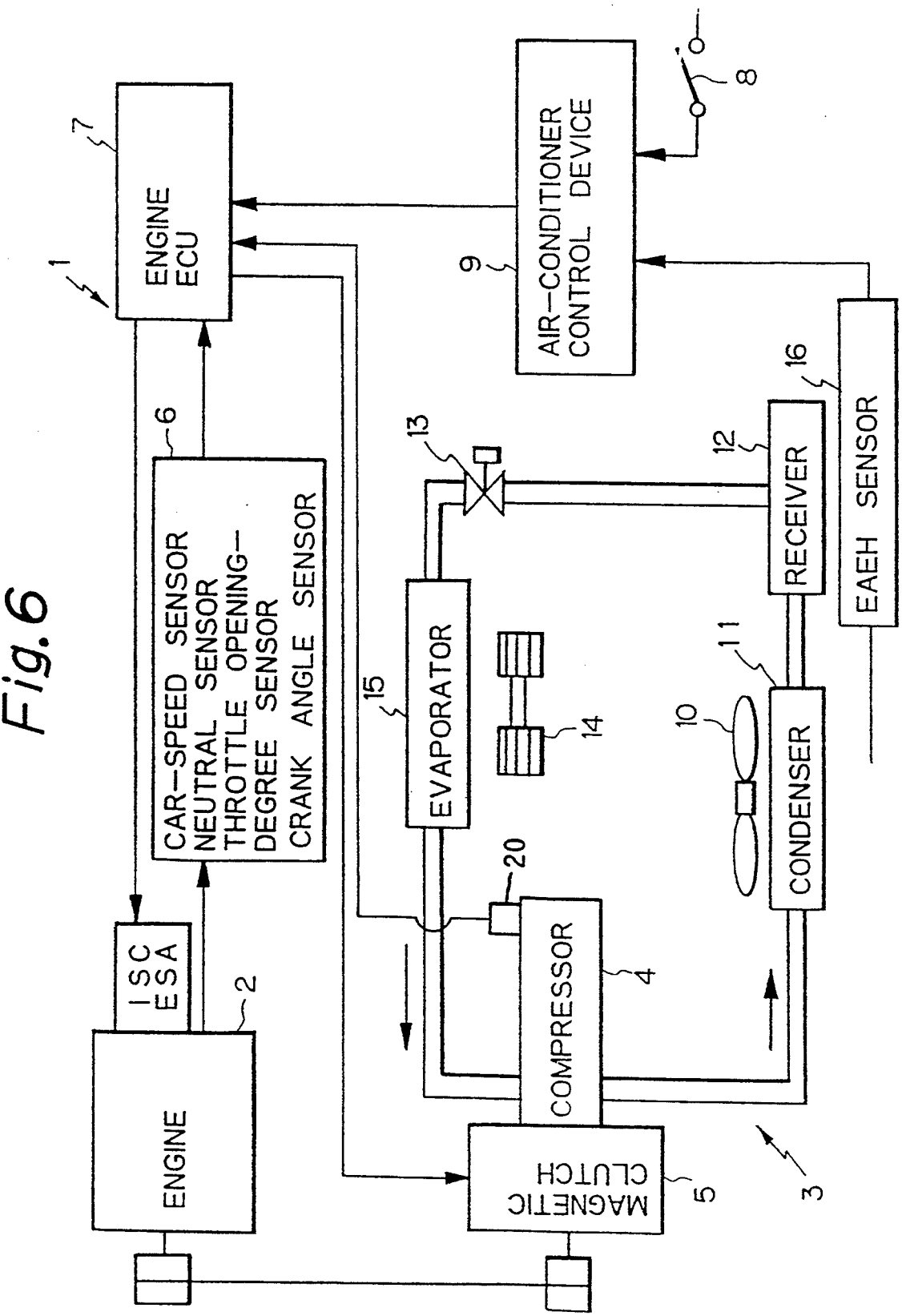
FIG. 6 is an overall block diagram of a compressed liquid refrigerant detecting device and compressor control device according to a third preferred embodiment.

It may be so constituted that a compressor rotation sensor 20 is provided at a shaft of compressor 4 as shown in FIG. 6, as a means for detecting the reduction rate of a driving force of the engine 2 immediately after the magnetic clutch 5 is energized, so as to detect the compressed liquid refrigerant in the compressor 4 by detecting a rising rate of rotation of compressor 4 using this sensor 20. That is, when there is no compressed liquid refrigerant in compressor 4, revolutions of the engine 2 are transmitted to the compressor 4 almost as is when the magnetic clutch 5 is energized and the rising rate of rotation of the compressor 4 increases rapidly, but when there is compressed liquid refrigerant in compressor 4, resistance is applied to the rotation of the compressor 4 which reduces the rate of increase of rotation of compressor 4 at that time. This rising rate of rotation is detected and when this rate of increase is smaller than a predetermined value, it is determined that the liquid refrigerant in the compressed condition is in compressor 4. The control of ECU 7 in this preferred embodiment can be executed by changing Step 12 in the flow chart in FIGS. 2A and 2B or FIGS. 4A and 4B to a step to determine whether the increase in rotation rate of the compressor 4 is smaller than the predetermined value or not with the other steps left as they are in FIGS. 2A and 2B or FIGS. 4A and 4B.

Also, it may be so constituted that, other than the 10 above first to third preferred embodiments, the reduction rate of the driving force of the engine 2 is detected by checking for a rate of change of the pressure, or the intake air volume, at an intake pipe when the vehicle is idling or the revolutions of the engine 2 are low. That is, when there is the compressed liquid refrigerant in compressor 4, the load on the engine gets larger, and the negative pressure at the intake of engine 2 falls rapidly. This fall in air pressure is conspicuous when the vehicle is idling or the engine 2 is producing a low number of revolutions. Then, by detecting that this change is larger than a predetermined value, the compressed liquid refrigerant in compressor 4 can be detected. The intake air amount is also rapidly reduced when there is liquid refrigerant in compressor 4, and this change is conspicuous when the vehicle is idling or engine 2 is in the low revolution zone. Then, by detecting this change, the presence of the compressed liquid refrigerant in compressor 4 can be detected.

Also, a strain gauge may be provided on the shaft of the compressor 4, for example on its surface, as a means for detecting the resistance to the driving force of the engine 2. In this case, when the compressor 4 contains liquid refrigerant in the compressed condition, a large torque is applied to the compressor 4 and the driving force of the engine 2 is reduced. As the shaft of the compressor 4 is strained at this time, which can be detected by a strain gauge, the presence of the compressed liquid refrigerant in the compressor 4 can be detected.

Also, it may be so constituted that a magnetic substance is provided at the shaft of the compressor 4 and a non-contact sensor is provided at the position opposite to this magnetic substance to detect the reduction in the driving force of the engine 2 by detecting an output from this sensor. That is, when compressor 4 contains liquid refrigerant in the compressed condition, the rate of revolution of compressor 4 is reduced, which changes the output of the non-contact sensor. It can be considered that when the reduction rate in the driving force of the engine 2 is large, compressor 4 contains the compressed liquid refrigerant.

Also, in the above first and second preferred embodiments, as a method for calculating the reduction rate in engine revolutions, a value corresponding to the rate of engine revolutions immediately before the magnetic clutch 5 is energized is compared with the rate of the engine revolutions immediately after the magnetic clutch 5 is energized, but an absolute value of the engine revolutions immediately before the magnetic clutch 5 is energized may also be compared with an absolute value of the engine resolutions immediately after the magnetic clutch 5 is energized. In this case, too, as with the first and second preferred embodiments, the compressed liquid refrigerant in compressor 4 can be detected more accurately by changing the set value according to the shift position of the transmission and the on/off state of the idle signal.

The mode of operation of the compressor control device according to the present invention can be summarized as follows:

The stopping means in the present invention is so constituted that energizing and de-energizing of the magnetic clutch are repeated for a first predetermined number of times, and a control means for that is provided.

Moreover, it is preferable that, when the energizing of the magnetic clutch is interrupted for a period of time by the above interrupting means, an idle-up prevention means is further provided for preventing the action of the idle-up control in response.

Also, it is preferable that, together with the stopping means in the present invention, when the above magnetic clutch is energized by a command from the above control means and this energized state is continued for more than a predetermined time, a means is provided for continuing the energized state.

Also, it is preferable that the above interrupting means in the present invention is further provided with a repeating control means constituted so that the energizing and de-energizing of the magnetic clutch is repeated and the above repeating control means is further provided with a means for de-energizing the above magnetic clutch when the above repeating operation is repeated more than the second predetermined number of times and different from the above mentioned first predetermined number of times and more than the first predetermined number of times.

According to the above first mode in the present invention, when the command to energize the magnetic clutch is sent by the control means and the magnetic clutch is energized based on this, the compressor compresses the refrigerant in the refrigerating system.

When liquid has collected in the compressor, the driving torque loss in the compressor is rapidly increased by the liquid in the compressor. Then, this driving torque loss in the compressor is transmitted to the engine through the magnetic clutch, which results in rapid reduction in the driving force of the engine.

Then, the driving force reduction rate detecting means in the present invention detects the reduction in the driving force of the engine immediately after the magnetic clutch is energized. When this reduction rate is larger than the predetermined value, it can be considered that the compressor contains liquid refrigerant in the compressed condition as explained above. In the present invention, the reduction rate detected by the reduction rate detecting means is compared with the predetermined value, and the compressed liquid contained in the compressor is detected by detecting that the reduction rate is larger than the predetermined value.

Also, according to the above second mode, when the reduction rate detected by the above reduction rate detecting means is larger than the above predetermined value, regardless of the command from the control means, the magnetic clutch is de-energized for a certain period of time. By this means, transmission of power from the engine to the compressor is interrupted, the compressor makes inertial rotation, and the compressed liquid refrigerant in the compressor 4 is gradually expelled.

As mentioned above, according to the present invention, the compressed liquid refrigerant in the compressor can be detected with an extremely simple method of detecting only whether the reduction rate of the driving force of the engine is larger than the predetermined value when the magnetic clutch is energized.

Also, as the magnetic clutch is de-energized for a certain period of time when the presence of the compressed liquid refrigerant in the compressor is detected, problems such as generation of noise, damage to the compressor or rapid reduction in the engine revolutions can be prevented.

Also, as the interrupting means in the present invention does not work when liquid refrigerant is not detected in the compressor, effects on vehicle performance such as deviations of the engine revolutions or vibration can be reduced. Also, as energizing and de-energizing of the magnetic clutch is not repeated more than necessary, deterioration of the magnetic clutch can be reduced.

We claim:

1. A device for detecting compression of a liquid refrigerant in a compressor comprising:
   a refrigerating system including a condenser, an expansion valve, an evaporator, and a compressor constructed and arranged to compress a refrigerant disposed therein;

a magnetic clutch adapted to transmit torque from an engine to said compressor when said clutch is energized;

control means for energizing said magnetic clutch; and means for detecting a reduction in an operating rate of said engine immediately after said magnetic clutch is energized by said control means, said detecting means being operable to detect a presence of compressed liquid refrigerant in said compressor by comparing the reduction in said operating rate of said engine with a predetermined value and by determining whether said reduction in said operating rate is larger than said predetermined value.

2. A device according to claim 1, wherein said detection means detects a reduction in a revolution rate of said engine immediately after said magnetic clutch is energized by the control means.

3. A compressor control device comprising;

a refrigerating system including a condenser, an expansion valve, and evaporator, and a compressor constructed and arranged to compress a refrigerant disposed therein;

a magnetic clutch adapted to transmit torque from an engine to said compressor when said clutch is energized;

control means for energizing said magnetic clutch;

means for detecting a reduction in an operating rate of said engine immediately after said magnetic clutch is energized by said control means; and interrupting means for comparing the reduction in said operating rate with a predetermined value and for immediately de-energizing said magnetic clutch for a period of time wherein said reduction in said operating rate is larger than said predetermined value.

4. A compressor control device according to claim 3, wherein said detecting means detects a reduction in a revolution rate of said engine immediately after said magnetic clutch is energized by said control means.

5. A compressor control device according to claim 4, wherein said interrupting means includes repeating control means for energizing and de-energizing the magnetic clutch for a predetermined number of times.

6. A compressor control device according to claim 4 further comprising an idle-up prevention means for cancelling an idle-up control when the magnetic clutch is de-energized by said interruption means for said period of time.

7. A compressor control device according to claim 4 further comprising means for continuing an energized state when said magnetic clutch is energized by said control means for more than a predetermined period of time.

8. A compressor control device according to claim 4, wherein said interrupting means further comprises repeating control means for energizing and de-energizing said magnetic clutch, said repeating control means including means for de-energizing said magnetic clutch when said magnetic clutch is energized and de-energized more than a predetermined number of times.

9. A device for detecting compression of a liquid refrigerant in a compressor comprising:

a refrigerating system including a condenser, an expansion valve, an evaporator, and a compressor constructed and arranged to compress a refrigerant disposed therein;

a magnetic clutch adapted to transmit torque from an engine to said compressor when said clutch is energized;

control means for detecting an increased rotation rate of said compressor immediately after said magnetic clutch is energized by the control means, said detecting means being operable to detect a presence of compressed liquid refrigerant in said compressor by comparing said increased rotation rate with a predetermined value and by determining whether said increased rotation rate is smaller than said predetermined value.

10. A compressor control device comprising:

a refrigerating system including a condenser, an expansion valve, an evaporator, and a compressor constructed and arranged to compress a refrigerant disposed therein;

a magnetic clutch adapted to transmit torque from an engine to said compressor when said clutch is energized;

control means for energizing said magnetic clutch;

means for detecting an increased rotation rate of said compressor immediately after said magnetic clutch is energized by said control means; and interrupting means for comparing the increased rotation rate of said compressor with a predetermined value and immediately de-energizing said magnetic clutch for a predetermined period of time, when said increased rotation rate is smaller than said predetermined value.

11. A device for detecting compression of a liquid refrigerant in a compressor comprising:

a refrigerating system including a condenser, and expansion valve, an evaporator, and a compressor constructed and arranged to compress a refrigerant disposed therein;

a magnetic clutch adapted to transmit torque from an engine to said compressor when said clutch is energized;

a control device for energizing said magnetic clutch; and a detecting device capable of detecting a reduction in an operating rate of said engine immediately after said magnetic clutch is energized by said control device, said detecting device being operable to detect a presence of compressed liquid refrigerant in said compressor by comparing the reduction in said operating rate of said engine with a predetermined value and by determining whether said reduction in said operating rate is larger than said predetermined value.

12. A compressor control device comprising:

a refrigerating system including a condenser, and expansion valve, an evaporator, and a compressor constructed and arranged to compress a refrigerant disposed therein;

a magnetic clutch adapted to transmit torque from an engine to said compressor when said clutch is energized;

a control device for energizing said magnetic clutch;

a detecting device for detecting a reduction in an operating rate of said engine immediately after said magnetic clutch is energized by said control device; and an interruption device for comparing the reduction in said operating rate detected by said detecting device with a predetermined value and for immediately de-energizing said magnetic clutch for a period of time wherein said reduction in said operating rate is larger than said predetermined value.

* * * * *